W. E. BRANTIGAM.
BALANCING RELAY.
APPLICATION FILED JAN. 2, 1920.
1,392,742.
Patented Oct. 4, 1921.
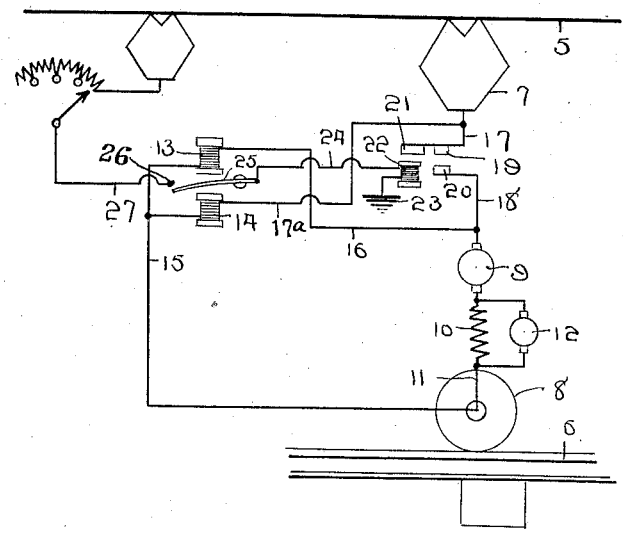
Inventor
W. E. Brantigam.
By Geo. P. Kimmel
Attorney

UNITED STATES PATENT OFFICE.

WILLARD E. BRANTIGAM, OF AVERY, IDAHO.

BALANCING-RELAY.

1,392,742.  Specification of Letters Patent. Patented Oct. 4, 1921.

Application filed January 2, 1920. Serial No. 348,888.

*To all whom it may concern:*

Be it known that I, WILLARD E. BRANTIGAM, a citizen of the United States, residing at Avery, in the county of Shoshone and State of Idaho, have invented certain new and useful Improvements in a Balancing-Relay, of which the following is a specification.

This invention relates to improvements in electric railway cars of the type wherein the propelling motor is utilized as a generator, as when the car is coasting down grade, to recharge the storage battery furnishing the necessary electro-motive force for the operation of the cars; and the invention has for its object to interpose a simple and reliable electrical device in the car circuit whereby the dynamo electric machine is maintained disconnected from the main or feed circuit until the electro-motive force thereof is built up, due to its increased speed, and equals or "balances" with the electro-motive force of the main circuit, whereupon a slight rise of electro-motive force causes the dynamo electric machine to be automatically cut into the main circuit and furnishes current thereto.

With these and other objects in view as will appear as the description proceeds, the invention comprises the novel features of construction, combination and arrangement of parts which will be more fully described in the following specification and then finally pointed out in the claims hereunto appended.

The figure represents a diagrammatic view of the invention.

Referring to the drawing in detail, the numerals 5 and 6 indicate the trolley wire and one of the rails of an electric railway having connection with the opposite poles of a storage battery or other source of electro-motive force by which the cars are operated. The car, as usual, is equipped with a pantograph trolley 7 engaging the trolley wire 5 and the car wheel 8 contacting with the track rail 6 forms an electric connection with the opposite or grounded side of the feed circuit. In the accompanying drawing, the armature 9 and field magnet or winding 10 are separately indicated for convenience of reference, but, as will be understood, the field magnets and armature are assembled in the usual manner in a compact electrical machine of the preferred type. According to the usual wiring arrangement for the tractor motors of railway cars, one of the poles of the motor is directly connected with the grounded side of the feed circuit through a conductor 11 and the opposite pole of the motor is connected through a rheostat (not shown) with the pantograph trolley 7 whereby the operation of the motor may be controlled or discontinued at the will of the operator. However, as the controller circuit for the motor forms no part of the present invention the same has not been illustrated.

The motor 9—10 is of the convertible type and is designed, when external power is applied thereto as when the car is coasting, to be utilized to generate an electrical current to be furnished to the main or feed circuit to assist in recharging the storage battery or other source of electro-motive force utilized in the operation of the railway system. The terminals of the field winding 10 are connected with an exciter 12 which, during the utilization of the dynamo electric machine 9—10 is operated to excite the winding 10 and thereby assist in the generation of electrical current.

The electrical elements first enumerated are common to the standard equipment of various types of electric locomotives or cars and the invention contemplates the provision of such electrical devices as will effectively control the electrical connections between the dynamo electric machine 9—10 and the trolley wire 5 when the dynamo electric machine is utilized for the generation of power.

In carrying out the invention, a pair of opposed electro-magnets 13 and 14 are provided and one terminal of each coil is connected by a conductor 15 with the grounded side of the main circuit through the car wheel 8 and track 6. The opposite terminal of the coil of the upper electro-magnet 13 is connected by a conductor 16 with the pole of the dynamo electric machine 9—10 opposite the ground 6 whereas the opposite pole of the coil of the lower electro-magnet 14 is connected with the trolley 7 by a conductor 17ª. Conductors 17 and 18 are connected with the trolley 7 and conductor 16, respectively, and are provided with normally spaced contact elements 19 and 20 which, when engaged, directly connect the pole or electrode of the dynamo electric machine 9—10 opposite the ground wire 11 directly with the trolley wire 5 through the trolley 7. The upper contact element 19 is movable and is normally maintained, by the inherent reliency of the material of which it is constructed or some other means in spaced relation to the contact element 20 and is provided terminally with an armature 21 associated with an electro-magnet 22 which, when energized, attracts the armature 21 moving the contact element 19 into engagement with the contact 20.

One terminal of the coil of the electro-magnet 22 is connected with the grounded side of the main circuit through a ground connection 23 and the opposite terminal of the coil is connected by a conductor 24 with an armature 25 disposed between the adjacent terminals of the electro-magnets 13 and 14.

In its normal position, the balanced armature 25 is normally disposed in a downwardly extending position, due to the fact that the lower electro-magnet 14 is normally energized through its direct connections 17ª and 15 with the trolley 7 and car wheel 8, thus when the magnetic attraction of the electro-magnet 14 is equalized by the electro-magnet 13, due to energization of the latter, the armature 25 is elevated and engages a contact member 26 connected to a conductor 27 with the controller of the car whereby the conductor 27 is connected in the trolley wire connection.

The operation of the invention may be briefly stated as follows:

When the car is coasting down grade and the controller is in full on position, the conductor 27 is connected to line, and the armature of the dynamo electric machine 9—10 is rotated due to its connection with the car axle. By proper manipulation of the exciter 12, the strength of the field magnet 10 of the dynamo electric machine is built up and the current generated by the dynamo electric machine is conducted to the electro-magnet 13 through the conductors 15 and 16 and when the strength of the electro-motive force generated by the motor generator equals that of the feed circuit, the electro-magnetic influence of the magnet 13 is increased to such extent as to balance the magnetic attraction of the magnet 14 and elevate the armature 25 engaging the terminal of the latter with the contact member 26, thereby completing the circuit to the electro-magnet 22 which, being energized attracts the armature 21 moving the contact element 19 into engagement with the contact element 20 and connecting the pole of the dynamo electric machine 9—10 directly with the trolley 7 through the conductors 17 and 18 causing the current generated by the dynamo electric machine to be fed into the main circuit in proportion to the speed gained and the excitation of the field winding 10. When the electro-motive force of the line exceeds that of the motor generator 9—10, the strength of the field of the magnet 13 is decreased, and the electro-magnet 22 is deënergized by reason of the armature 25 being returned to its initial position by the greater magnetic attraction of the magnet 14 and the wiring arrangement restored to normal condition. It is to be here noted that the magnets 13 and 14 are of a sufficient resistance as to prevent short circuiting of the line, when the motor is regenerating.

What I claim is:

1. In a device of the character described, overhead and ground conductors, a dynamo electric machine, an electrical connection on one side of the dynamo electric machine connected with the ground conductor, opposed electro-magnets, electrical connections between one of the electro-magnets and the ground and overhead conductors, means electrically connecting the other magnet with the ground conductor and the pole of the dynamo electric machine opposite the ground conductor, an armature associated with the electro-magnets and operated thereby, the first mentioned magnet being normally energized, normally spaced contact elements connected respectively with the overhead conductor and the pole of the dynamo electric machine opposite the ground conductor, and electro-magnetic means controlled by the armature to move the last mentioned contact elements together and directly connect the dynamo electric machine with the overhead conductor.

2. In a device of the character described, a main circuit including a trolley wire and track rail, a dynamo electric machine, normally spaced contact elements connected respectively with the trolley wire and one side of the dynamo electric machine, an electrical connection between the opposite side of the dynamo electric machine and the track rail, a normally energized electro-magnet connected with the trolley wire and track rail, an armature associated with the electro-magnet, a second electro-magnet arranged in opposed relation to the first mentioned electro-magnet and associated with said armature, means electrically connecting the last mentioned electro-magnet with the track rail and the dynamo electric machine and adapted, when the latter is operated as a generator to be energized thereby to equalize the magnetic attraction of the first mentioned electro-magnet and actuate said armature, electro-magnetic means associated with the first mentioned contact elements to move the latter together when the electro-magnetic means is energized, means connecting the electro-magnetic means with the track rail, an electrical connection between the electro-magnetic means and said armature, and means engaged by the armature when the latter is actuated by the magnetic attraction of the second mentioned magnet to electrically connect the electro-magnetic means with the main circuit and thereby establish connection between the contact elements.

In testimony whereof, I affix my signature hereto.

WILLARD E. BRANTIGAM.